Jan. 14, 1930.  R. V. L. HARTLEY  1,743,670
CONTROLLING THE FREQUENCY OF AN ALTERNATING CURRENT
Filed Dec. 24, 1923
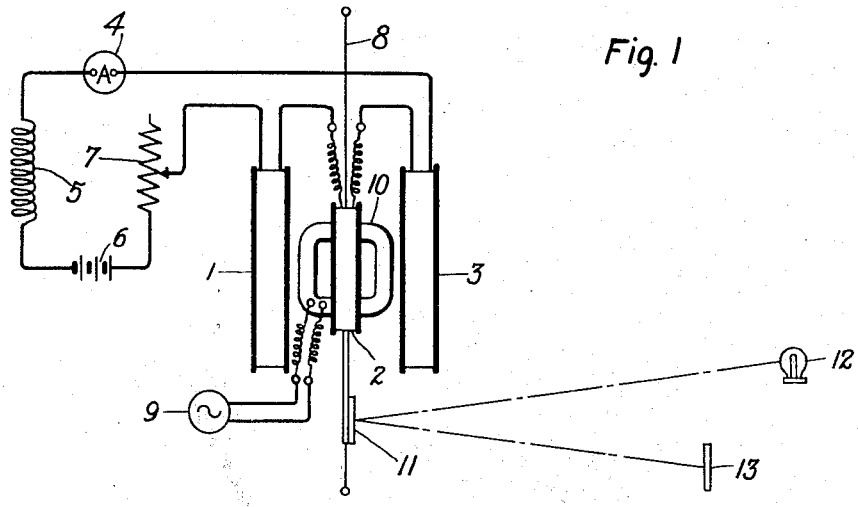
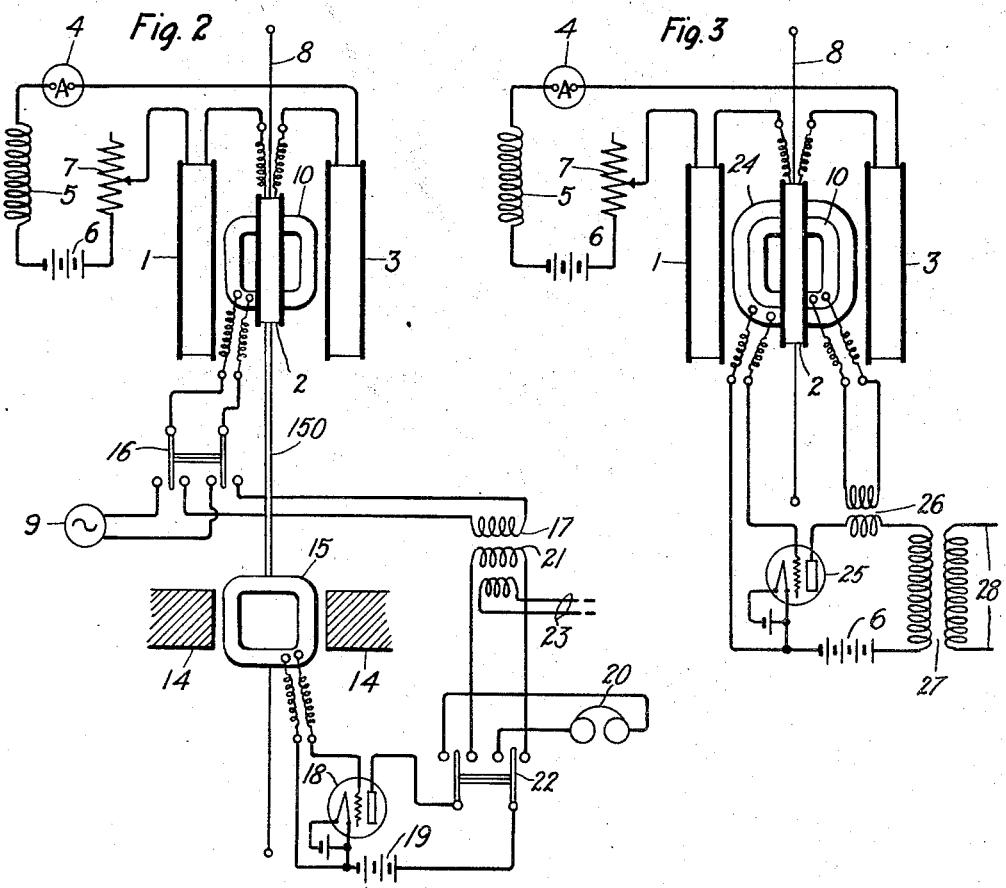
Inventor:
Ralph V. L. Hartley
by ⟨signature⟩ Atty Patented Jan. 14, 1930

1,743,670

UNITED STATES PATENT OFFICE

RALPH V. L. HARTLEY, OF SOUTH ORANGE, NEW JERSEY, ASSIGNOR TO WESTERN ELECTRIC COMPANY, INCORPORATED, OF NEW YORK, N. Y., A CORPORATION OF NEW YORK

CONTROLLING THE FREQUENCY OF AN ALTERNATING CURRENT

Application filed December 24, 1923. Serial No. 682,499.

This invention relates to a method of and means for controlling the frequency of an alternating current.

It has heretofore been proposed to utilize the mechanical selectivity of a tuning fork, tuned reed or a pendulum to control the frequency of the oscillating current. In the arrangements heretofore proposed the mechanical vibrating element is associated with the input and output circuits of a three element electric discharge device to constitute an oscillation generator. In such arrangements the reaction between the circuits is purely mechanically controlled or partly mechanically and partly inductively controlled. In any event, the frequency of the energy transferred from one circuit to the other is controlled by the vibrating element. To vary the frequency of the current generated by an oscillator employing a vibrating element of this type, the natural period of the element must be changed to conform to the new value. It has been suggested that this may be done either by changing the length of the vibratory element or by applying an adjustable load to it. When it is desired to continuously vary the frequency of the oscillating current generated over a wide range of frequencies, each of these methods of control presents practical difficulties because the moment of inertia and stiffness of the vibratory element are more or less definitely fixed and hence the range of adjustability of the element is limited.

The present invention embodies an arrangement which includes a mechanical vibrating element having electrically energized control means associated with it, whereby not only may its stiffness and rate of vibration be controlled, but by varying the current supplied to the control means the period of the vibrating element may be varied over a wide range.

According to this invention a pair of fixed coils coaxially arranged in parallel planes have a movable coil suspended in coaxial relation thereto and in a medial plane parallel with the fixed coils, the fixed and movable coils being connected in series with an adjustable control means and a source of current supply. When the circuit of the coils is opened the movable coil is suspended so as to oscillate freely that is without substantial damping. With current flowing through the series connected coils a magnetic field is produced which tends to maintain the movable coil in its normal position relatively to the fixed coils. The amplitude of the current flowing through the coils serves to regulate the stiffness of the movable coil, i. e., the value of the force which must be applied to the movable coil to cause it to oscillate and also controls its periodicity or oscillating rate. By varying the resistance of the circuit to vary the amplitude of the current supplied by the source, both the stiffness and the periodicity of the movable coil element may be varied continuously between limits defined solely by mechanical considerations.

The preceding statement describes briefly and in a general way one form of apparatus employing the principles of the present invention which will be set forth in detail in the following description. It is, therefore, not to be interpreted as defining the scope of this invention. The several novel features and combinations which are believed to be characteristic of the present invention will be pointed out with particularity in the attached claims.

One object of this invention is to provide a frequency controlling arrangement which embodies mechanical selectivity together with electrical flexibility of adjustment. Another object is to provide an apparatus whereby the current components of different frequencies of which a complex current wave is composed may be selected. Still another object is the provision of a mechanical oscillating frequency controlling element which may have its periodicity continuously varied over a relatively wide range.

For an understanding of the present invention and the operation of its various parts, reference may be had to the following description taken in connection with the attached drawing, in which Fig. 1 shows a simple form of apparatus embodying the invention; Fig. 2 shows an apparatus similar to Fig. 1 having the elemental features differently arranged, and Fig. 3 illustrates an oscillation generator which includes the frequency controlling element of this invention.

In Fig. 1 there is shown a plurality of coils 1, 2 and 3 connected in series with each other and also with an ammeter 4, a choke coil 5, a source of direct current 6, and a variable resistance 7. The coils 1, 2 and 3 are coaxially arranged in adjacent parallel planes and the movable coil 2 is suspended so that it is unrestrained and may be freely rotated when the circuit of the source 6 is opened. The suspension means for the coil 2 may be of any well known type adapted to satisfy these conditions, for example, a torsionless thread suspension 8 may be used. When the current is supplied to the series connected coils 1, 2 and 3, a magnetic field will be produced interlinking them which tends to maintain the movable coil 2 in parallel relation with the stationary coils 1 and 3. The magnitude of the field serves to regulate the restraining force applied to the movable coil and hence its rate of oscillation. Obviously, the intensity of the magnetic field will be substantially fixed by the amplitude of the current flow through the coils 1, 2 and 3. By adjusting the resistance 7 to different values the intensity of the magnetic field which interlinks the coils may be varied and hence the stiffness and periodicity of the movable element may be adjusted to any desired value. As is well known, the oscillating rate of a movable element of this type is proportional to the $\sqrt{\frac{stiffness}{inertia}}$, so that for an element of selected inertia there is a maximum and minimum rate at which it can be vibrated. By providing a source 6 adapted to supply a current whose amplitude is somewhat greater than that required to control a stiffness factor corresponding to the maximum rate of vibration of the movable element and a continuously variable resistance 7 adapted to reduce the current to a value such that the stiffness factor corresponds to the minimum vibration rate of the element, its periodicity may be continuously varied over the complete operative range.

With a current of definite amplitude flowing through the coils 1, 2 and 3 and a source of power either mechanically or electrically adapted to supply impulses of energy to the vibratory element at the proper instants, the element may be caused to oscillate. As shown in Fig. 1, an alternating current source 9 is connected to a coil 10 to supply the driving force, and coil 10 is carried by the suspension 8 in a plane at right angles to the plane of the coil 2. By the interaction of the magnetic field set up by the alternating current flowing through the coil 10 and the normal field produced by the direct current from the source 6, the suspended element comprising the coils 2 and 10 may be caused to oscillate provided the frequency of the alternating current corresponds to the oscillatory period of the suspended element. Because of the normal magnetic field controlled by the setting of the resistance 7, the oscillating element may be made sharply selective of a single frequency, and by varying the adjustment of the resistance 7 the periodicity of the element may be varied to correspond to a plurality of different frequencies. By supplying alternating currents of different frequencies to the coil 10 and by varying the resistance 7 until the suspended element is caused to oscillate, the ammeter may be calibrated to read in terms of frequency.

As stated above, the magnitude of the current flowing through the coils 1, 2 and 3, which is indicated by the ammeter 4, regulates the periodicity of the oscillating element and hence if the ammeter has been previously calibrated, its reading will serve to indicate the frequency of the alternating current supplied to the coil 10. A simple means for indicating an oscillatory condition of the suspended element comprises a mirror 11 carried by the support for the movable coils which serves to deflect a beam of light from the source 12 on to a scale 13.

Because of the oscillatory movement of the coil 2 and the flow of alternating current through the coil 10, an alternating current will be produced in the energizing circuit including the source 6. Any current flowing through the energizing circuit will tend to modify the magnetic field which interlinks the coils 1, 2 and 3 and hence change the selectivity of the vibrating element. In order to provide a vibrating element the selectivity of which is accurately fixed by the direct current supplied by the source 6, a choke coil 5 is included in series with this source. The purpose of the coil 5 is to substantially prevent the flow of alternating current in the energizing circuit.

In order to detect a current of unknown frequency, this apparatus may be used as follows: Direct current is supplied to the coils 1, 2 and 3 from the source 6, the alternating current of unknown frequency is supplied to the coil 10, and the resistance 7 is adjusted until the movable element oscillates, when the frequency of the current may be read directly from the calibrated meter 4. In a similar manner by setting the resistance 7 to give the oscillating element a definite periodicity, the frequency of the alternating current supplied by the source 9 may be adjusted to a definite value.

Referring to Fig. 2, there is shown a control arrangement identical with that described above, for regulating the periodicity of an oscillating element, which comprises the cooperating coils 1, 2 and 3, the ammeter 4, the choke coil 5, the direct current source 6, and variable resistance 7. The operating element consisting of the driving coil 10 is arranged in a plane at right angles to that of the coil 2. The suspension means 8 carries the coils 2 and 10, as in the preceding figure, and, in addition, a driven coil 15 suspended between the pole pieces 14 of a magnet adapted to produce a magnetic field of constant intensity. Thus, this arrangement may be said to consist of a control and driving unit and a driven unit having their movable elements 2—10 and 15 mechanically connected together by a rigid rod 150.

As shown in this figure the driving coil 10 may be connected by a switch 16 to a source 9 or to a coil 17. The driven coil 15 is included in the input circuit of a repeater device 18, herein shown as a space discharge device. The output circuit of the device 18 includes a source 19 adapted to supply space current to the device, either through an indicating device 20 or a coil 21, under the control of a switch 22.

If this apparatus is to be used for the purpose described with reference to the arrangement shown in Fig. 1, the switches 16 and 22 will be moved into engagement with their left hand contacts respectively. The source 9 will, therefore, be connected to the coil 10, and the indicator 20 will be included in the output circuit of the device 18.

Although the indicator 20 is shown, by way of example, as a telephone receiver, if the frequencies are outside the audible range, any other known indicating instrument may be used.

The driving force supplied by the source 9, if of a frequency corresponding to the periodicity of the suspended element, will cause the element to oscillate and generate an alternating current of the same frequency in the coil 15. The electromotive force produced in the coil 15 is impressed upon the input circuit of the repeater device 18 and will be produced in its output circuit.

When the amplitude of the current flowing through the coils 1, 2 and 3 is such that the suspended system has an oscillating period corresponding to the frequency of the oscillating current supplied by the source 9, a note corresponding to the frequency of the source 9 will be heard in the receiver 20. This arrangement may, therefore, be used to detect the components of different frequencies entering into an electric wave of complex form, since by varying the resistance 7 the suspended system may be given different periodicities which correspond to the frequencies of the various components of the complex wave.

If it is desired to use this apparatus to generate oscillations the switches 16 and 22 will be moved into engagement with their right hand contacts, whereby the coil 10 will be connected to the coil 17 and the coil 21 will be included in the output circuit of the device 18.

Any disturbance which causes the suspended system to oscillate will produce electrical current in the coil 15 of a frequency corresponding to the selected period of the system. The electromotive force developed in the coil 15 will be impressed upon the input circuit of the device 18 to control the flow of space current therein. Due to the amplifying properties of the device 18, alternating current of increased amplitude will be supplied by the transformer 21—17 to the coil 10 to maintain the oscillatory condition of the suspended system. Sustained oscillations will, therefore, be supplied to a load circuit 23. The oscillatory period of the movable coil system and hence the frequency of the current generated may be changed by varying the resistance 7.

An oscillation generator adapted to employ the frequency determining apparatus described in Fig. 1 is shown in Fig. 3. Supported by the suspension means 8, coaxially with the coil 10, is a driven coil 24. Thus coil is included in the input circuit of a repeater device 25, herein shown as space discharge device, the output circuit of which is coupled to the driving coil 10 by the transformer 26.

As described above with reference to Fig. 2, if the suspended system is caused to oscillate the energy generated in the coil 24, due to its oscillatory movement will cause an alternating potential of definite frequency to be impressed upon the grid element of the repeater 25 to control the current flowing in the space path thereof and hence cause an alternating current of the same frequency to flow through the plate circuit including the primary winding of the coupling coil or transformer 26. The driving coil 10 is included in series circuit with the secondary of the transformer 26. Alternating current will be applied through the transformer 26 to the coil 10 to maintain the suspended system oscillating and oscillations will be supplied through the transformer 27 to the load circuit 28. The frequency of the oscillations generated may be controlled by varying the resistance 7.

This invention provides an arrangement which, while adapted to utilize the sharp selective properties of the mechanical vibrating system to control the frequency of an electric current wave, does not involve the limitations as to adjustability resulting from the relatively fixed stiffness of the mechanical element employed.

Obviously, the movable coil arrangement shown in Fig. 1 may have a coil similar to coil 15 associated with it and may be used with a repeater device, such as 18 and indicator 20 to detect an alternating current of selected frequency. Moreover, a mirror could be secured to the movable element 150 of Fig. 2 to cooperate with a light source and a scale in a manner similar to that described in reference to Fig. 1.

While a particular circuit arrangement and specific details have been herein shown and described with the object of completely and clearly disclosing the principles of the invention, it will be appreciated that the underlying principle of this invention resides in the use of a mechanical oscillating system electrically controlled, whereby the sharp selectivity of the former may be combined with the flexibility of adjustment of the latter. It is, therefore, to be understood that this invention is not limited to the arrangements herein disclosed, but only by the scope of the appended claims.

What is claimed is:

1. A method of controlling the frequency of an alternating current by means of a mechanical vibrating element which comprises causing a direct current to regulate the periodicity of the vibrating element causing said vibrating element to generate the alternating current and driving the element by said alternating current.

2. A method of frequency selection by means of a mechanical vibrating element which comprises producing a controlling magnetic field to fix the rate of vibration of the element, regulating said magnetic field to vary the rate of vibration of the element, driving said element by an alternating current of variable frequency, and causing the element to oscillate at the frequency desired.

3. A method of regulating the vibration rate of a mechanical vibrating element which comprises driving said element with an alternating current, and electrically energizing the vibrating element with a current of selected amplitude whereby the desired periodicity of said element is secured.

4. The method of varying the vibration rate of a mechanical vibrating element which comprises energizing a plurality of coils, connected in series, with a direct current, placing said coils so that the fields of their windings overlap to control the periodicity of the vibrating element and controlling the amplitude of the current to vary the periodicity of the vibrating element over a relatively wide range.

5. A method of generating oscillations which comprises electrically regulating the periodicity of a mechanical vibrating element and actuating the vibrating element to control the production of oscillations of a frequency corresponding to the periodicity of said vibrating element.

6. A method of generating oscillations by means of an arrangement including a mechanical vibrating element and an electron discharge device which comprises electrically controlling the stiffness of the vibrating element, actuating said element to control the production of oscillating current, controlling the space current of the electron discharge device by said oscillating current and utilizing the oscillating component of said space current to maintain a vibratory condition of said element.

7. A frequency regulating means comprising a mechanical element normally adapted to vibrate freely, electrical means comprising a plurality of coils connected in a circuit to control the periodicity of said element, and an angularly disposed coil to excite vibrations in said mechanical element.

8. A frequency controlling means comprising a mechanical element normally adapted to vibrate freely, means associated therewith to fix the periodicity of said element comprising a source of electric current and a plurality of coils connected in a circuit, a coil angularly disposed with respect to said coils, and means to regulate the amplitude of the current supplied to the periodicity controlling means.

9. A frequency controlling means comprising a mechanical element normally adapted to vibrate freely, means associated therewith comprising a plurality of coils connected in a circuit for producing a magnetic field which regulates the periodicity of said element, an angularly disposed coil for exciting vibrations and means for controlling the intensity of the magnetic field.

10. Means for controlling the rate of vibration of a mechanical element normally adapted to vibrate freely comprising a plurality of cooperating coils, one of which is carried by said element, a circuit including said coils, a source of current and an adjustable resistance connected in series.

11. Means for controlling the rate of vibration of a mechanical element normally adapted to vibrate freely comprising a plurality of cooperating juxtaposed coils, one of which is carried by said element, a circuit including said coils and a source of current connected in series, and means included in said circuit to vary the amplitude of the current supplied by said source.

12. An oscillation generator comprising a mechanical element adapted to vibrate freely, electrical means to fix the periodicity of said element, means for driving said element associated therewith, means for controlling the production of alternating current associated with said element and means controlled by said alternating current for supplying energy to said driving means.

13. An oscillation generator comprising a mechanical element adapted to vibrate freely, electrical means to control the periodicity of said element, means for driving said element associated therewith, means for producing alternating current and means for varying the amplitude of the current supplied to the electrical controlling means.

14. A generator of sustained oscillations comprising a mechanical vibrating element, electrical means for controlling the periodicity of vibration of said element, an electron discharge device having input and output circuits, means carried by said element and included in the input circuit of said device for producing alternating current, and a driving means for said element associated with the output circuit of said device.

15. A generator of sustained oscillations comprising a mechanical vibrating element; means for controlling the periodicity of said element comprising a movable coil carried by said element, a plurality of fixed coils adapted to cooperate therewith, a source of current for supplying current to said movable and fixed coils and means for controlling the amplitude of the current supplied to the coils; an electron discharge device having input and output circuits; a coil included in the input circuit of said device; and a driving coil supplied with current from the output circuit of said device, said coils being carried by the vibrating element.

In witness whereof, I hereunto subscribe my name this 20th day of December, A. D. 1923.

RALPH V. L. HARTLEY.